Sept. 18, 1956 A. VAUGOYEAU 2,763,498
MEANS FOR TAKING UP PLAY IN VEHICLE COUPLINGS
CONSTITUTED BY HOOKS AND RINGS
Filed Feb. 26, 1953

INVENTOR:
ALEXANDRE VAUGOYEAU
BY: Chatwin & Company
ATTYS.

United States Patent Office 2,763,498
Patented Sept. 18, 1956

2,763,498

MEANS FOR TAKING UP PLAY IN VEHICLE COUPLINGS CONSTITUTED BY HOOKS AND RINGS

Alexandre Vaugoyeau, Marseille, France

Application February 26, 1953, Serial No. 339,087

2 Claims. (Cl. 280—506)

Tow bars used for the coupling of trailer vehicles to lorris usually have a ring which is engaged with a hook on the lorry.

It is desirable to eliminate any play between the ring and hook because repeated hammering of the ring on the hook during movement of the vehicles deforms the members and may result in breakage due to crystallisation of the metal.

The object of the present invention consists in the provision of means for eliminating play between the ring and the hook, even when the members have become worn.

This is achieved in the present invention by adjustable stops for automatically taking up the play, said stops acting on the ring to retain it firmly against the hook.

Figure 1:
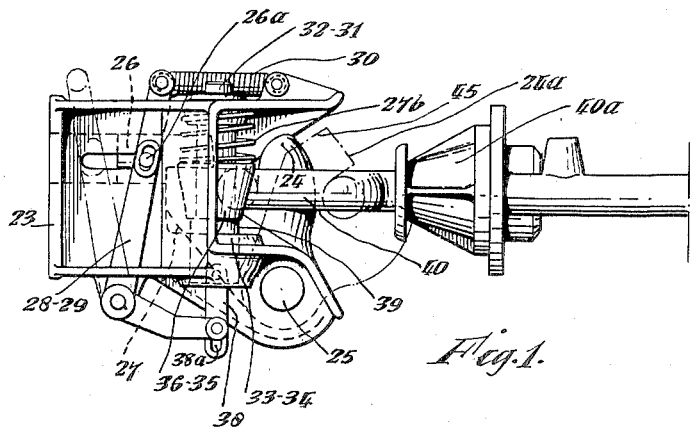
Figure 2:
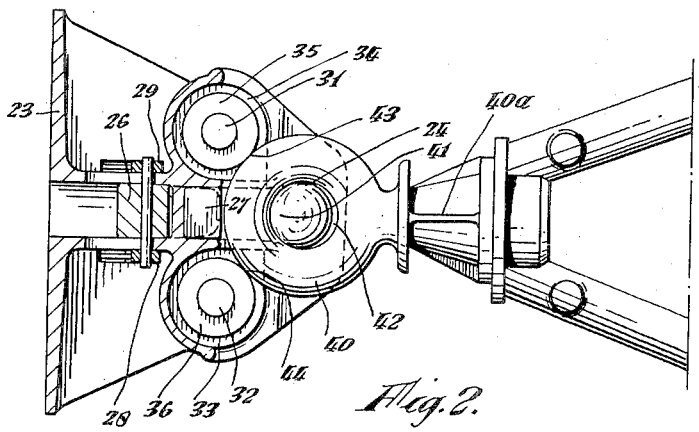
Figure 3:
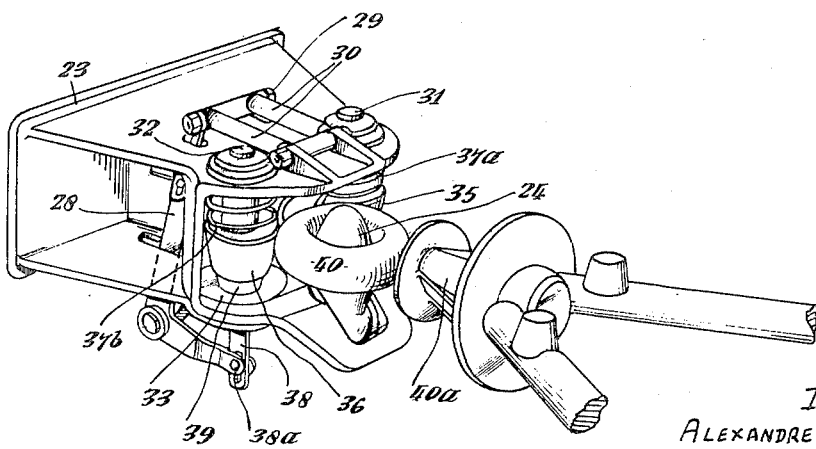

An embodiment in accordance with the invention is illustrated by way of example in the accompanying drawings, wherein:

Fig. 1 is a side elevation of a hook and ring coupling;
Fig. 2 shows in plan view the coupling with certain parts broken away, Fig. 3 shows the coupling in perspective view.

A hook-mounting coupling member 23 on the towing vehicle has a hook 24 pivotable about a transverse horizontal pivot shaft 25. In Fig. 1 the hook is shown also in a second position in dotted lines so as to more clearly illustrate a cam abutment 24a thereon, this abutment being adapted, in locked position of the hook, to engage against a slidable locking member 26 having an inclined front surface 27. Two similar levers 28, 29 are pivoted on the member 23 and are coupled to the locking member 26 by lugs 26a. The levers are urged clockwise in Fig. 1 by springs 30 and thus tend to keep the locking member forward also.

Two vertical shafts 31 and 32 are slidable in sockets 33 and 34 on the coupling member 23. On these shafts are slidably and rotatably mounted conical rollers 35 and 36 urged downwardly respectively by springs 37a and 37b.

The shafts 31 and 32 are coupled respectively to the levers 29, 28 by connection rods 38 having lost-motion slots 38a. On the shafts 31 and 32 are lugs 39 supporting the respective rollers against their spring loading.

On the trailer vehicle is provided a ring mounting 40a and a ring 40 thereon. The shape in section of the hook is formed by a semi-circular portion 41 of the same diameter and with the same center as that of the ring 40, combined with another portion which leaves at the rear a slight play 42 between the hook 24 and the ring 40.

In this embodiment, any play between the hook and ring is automatically taken up and eliminated at the moment of coupling. The hook 24 pivoting on the shaft 25 is normally locked in the upright position illustrated by the locking member 26.

The position of the rollers 35 and 36 is arranged in such a manner that when the ring of the trailer vehicle is engaged on the hook, said rollers enter into contact with the ring at points 43 and 44 situated on the horizontal axis which passes through the center of the toroid section of the ring 40.

When the hook is released it passes into the inclined position shown in dotted line in Fig. 1. For engagement of the ring with the hook, the ring is placed thereon and when the towing vehicle momentarily reverses, the hook 24 turns about its shaft 25 in anti-clockwise direction in Fig. 1. The heel surface 45 comes into contact with the front surface of the locking member 26 which is driven slidably back against the spring 30. During this movement the levers 29 are also driven anti-clockwise and thus lift the shafts 31 and 32 by means of the connecting rods 38. In their rising movement, the shafts 31 and 32 abut against and lift the rollers 35 and 36 which are accordingly moved clear of the ring 40 and permit the latter to continue inward movement until the surface 45 slips under and past the locking member 26. The latter is then rapidly moved forward into locking position by the action of the springs 30.

The levers 28 and 29 moving clockwise again likewise drive the shafts 31 and 32 downwardly and thus free the conical rollers 35 and 36. These latter are accordingly moved downwardly by their springs 37a and 37b until the moment when they abut against the ring 40. The ring 40 is thereby firmly engaged by the rollers 35 and 36 against the hook 24, thus eliminating any play.

If the diameter of the toroid of the ring 40 becomes less the rollers 35 and 36 will descend further in proportion.

I claim:

1. A coupling device for vehicles comprising a hook mounting for a towing vehicle, a hook on said mounting, a ring mounting for a towed vehicle, a ring on said mounting, the cross-section of the hook taken in the central plane of the ring when the ring is engaged on the hook being constituted by a semi-circular portion against which the ring bears during towing and of the same radius as the bore of the ring, and a segmental portion allowing a slight play between the hook and ring, two shafts parallel to the axis of the ring carried on the hook mounting one at each side of the hook and having their axes on extended radii included in the semi-circular portion of the hook, a tapered roller slidably and rotatably mounted on each shaft, and means for urging the tapered rollers along their respective shafts so as to abut against the ring to retain the ring in abutment against the semi-circular portion of the hook.

2. A coupling device for vehicles comprising a hook mounting for a towing vehicle, a transverse horizontal pivot on said mounting, a hook including a nose portion and a cam portion rotatably carried on the pivot, a ring mounting for a towed vehicle, a ring on said mounting, the cross-section of the nose portion of the hook taken in the central plane of the ring when the ring is engaged on the nose portion being constituted by a semi-circular portion against which the ring bears during towing and of the same radius as the bore of the ring, and a segmental portion allowing a slight play between the nose and the ring, two shafts parallel to the axis of the ring and carried in axially slidable manner on the hook mounting one at each side of the hook and having their axes on extended radii included in the semi-circular portion of the nose, a tapered roller slidably and rotatably mounted on each shaft, spring loading disposed between the hook mounting and each roller for resiliently urging the tapered rollers along their respective shafts in the direction to abut against the ring when the ring is engaged on the nose, a lug secured on each shaft to engage with the roller thereon and by axial movement of the shaft to move the roller against the spring-loading, a spring-loaded locking member slidably seated in the hook mounting to bear against the cam portion of the hook, and linkage arranged to act between the locking member and the two shafts such that as the locking member is moved in one direction against its spring-loading by the hook with the ring thereon moving towards locked posoition the shafts by their lugs move the rollers clear of the ring, and when the hook with the ring thereon reaches locking position the cam portion releases the locking member to move under its spring-loading and allow the shafts with the rollers to move axially until the rollers abut against the ring.

References Cited in the file of this patent

UNITED STATES PATENTS

| | | |
|---|---|---|
| 1,739,986 | Reid | Dec. 17, 1929 |
| 1,824,843 | Staley | Sept. 29, 1931 |
| 1,832,042 | Mohr | Nov. 17, 1931 |
| 2,202,867 | Rankin | June 4, 1940 |
| 2,370,679 | Mortenelli et al. | Mar. 6, 1945 |
| 2,397,558 | Mennen | Apr. 2, 1946 |
| 2,429,761 | Ketel | Oct. 28, 1947 |

FOREIGN PATENTS

| | | |
|---|---|---|
| 416,192 | France | Oct. 3, 1910 |
| 673,550 | France | Jan. 16, 1930 |